United States Patent [19]
Worley

[11] 3,923,709
[45] Dec. 2, 1975

[54] 3,4-DIHYDRO-3-OXO-2H-1,4-BENZOTHIAZINES AND BENZOXAZINES

[75] Inventor: Jimmy W. Worley, Creve Coeur, Mo.

[73] Assignee: Monsanto Company, St. Louis, Mo.

[22] Filed: Aug. 30, 1974

[21] Appl. No.: 502,114

[52] U.S. Cl. .................. 260/240 K; 71/73; 71/74; 71/88; 71/90; 260/240 R; 260/243 R; 260/244
[51] Int. Cl.$^2$............... C07D 279/14; C07D 265/36
[58] Field of Search............ 260/244, 243 R, 240 K, 260/240 R, 240 F

[56] References Cited
UNITED STATES PATENTS
3,733,321   5/1973   Krapcho.......................... 260/243 R

OTHER PUBLICATIONS

Chemical Abstracts, Vol. 72, Abst. No. 21702g (1970). (Abst. of Ger. Offen. 1,910,302).

*Primary Examiner*—John D. Randolph
*Attorney, Agent, or Firm*—Arnold H. Cole

[57] ABSTRACT

Certain 2-alkylidene and benzylidene-3,4-dihydro-3-oxo-2H-1,4-benzothiazine and benzoxazine-4-acetic acids and esters thereof have been found to be useful in the treatment of various desired and undesired plants.

12 Claims, No Drawings

3,4-DIHYDRO-3-OXO-2H-1,4-BENZOTHIAZINES AND BENZOXAZINES

This invention relates to a new class of organic chemical compounds. More particularly, this invention is concerned with novel heterocylic compounds which can generally be designated as derivatives of 3,4-dihydro-3-oxo-2H-1,4-benzothiazine and benzoxazine-4-acetic acid or the esters thereof. The specific derivatives herein are those wherein an alkylidene or benzylidene group is substituted at the 2-position of the heterocyclic ring. This class of compounds has been found to be useful to destroy, or prevent the growth of, undesired plants (weeds), and has also been found to produce beneficial, growth-regulating responses in desired plants (crops).

The novel compounds of the present invention can be represented by the following structural formula

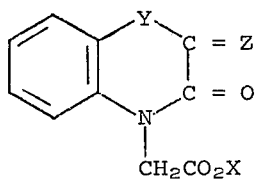

wherein X is hydrogen or alkyl of up to four carbon atoms, Y is oxygen, sulfur or sulfoxide (SO), and Z is cyclohexylidene ($C_6H_{10}$), or

wherein R and R' are each independently hydrogen or lower alkyl, or

wherein R'' is phenyl, styryl, 3,4-methylenedioxyphenyl or

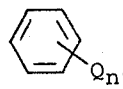

wherein $n$ is an integer from one to three, and Q is halogen, nitro, amino, di(lower alkyl)amino, lower alkyl, lower alkoxy, lower alkylthio, hydroxy or trifluoromethyl. As employed herein, the term "lower" designates a radical containing from one to three carbon atoms in a straight or branched chain.

Preparation of compounds of this invention can be accomplished by a number of reaction schemes. In one procedure, the starting material is 2-chloro-3,4-dihydro-3-oxo-2H-1,4-benzothiazine-4-acetic acid or an ester thereof (I).

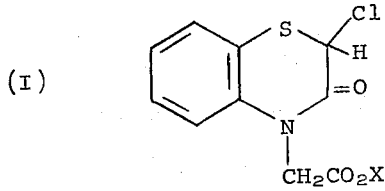

The unhalogenated precursors of such materials are prepared by the method shown in Canadian Journal of Chemistry, Vol. 44, pp. 1247–1258 (1966), and such precursors are treated with a chlorinating agent such as sulfuryl chloride to give said 2-chloro derivatives. This starting material is reacted with a trialkyl phosphate to give an intermediate product which is 2-dialkoxyphosphinyl-3,4-dihydro-3-oxo-2H-1,4-benzothiazine-4-acetic acid or an ester thereof (II).

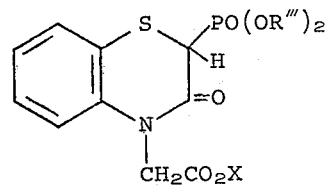

Reaction of this intermediate with an aldehyde or ketone,

yields a compound of this invention.

In a second procedure, the starting material is 2-chloro-3,4-dihydro-3-oxo-2H-1,4-benzothiazine. Reaction with a trialkyl phosphite gives the corresponding 2-dialkoxyphosphinyl compound, which is in turn reacted with an aldehyde or ketone to give the 2-alkylidene or benzylidene-3,4-dihydro-3-oxo-2H-1,4-benzothiazine (III).

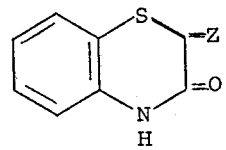

Reaction of this intermediate with bromoacetic acid or an ester thereof yields a compound of this invention. It should be noted that said intermediate (III) can also be made by reacting the aldehyde or ketone directly with 3,4-dihydro-3-oxo2H-1,4-benzothiazine. However, this reaction does not proceed as easily with a number of the

reactants, and yields may not be as high.

The reaction schemes described above can also be employed to prepare the corresponding benzoxazine compounds of this invention. One difference which should be recognized is that the starting 2-chloro materials are not made by chlorination of a 2-unsubstituted compound. Rather, the precursor employed is 2-hydroxy-3,4-dihydro-3-oxo-2H-1,4-benzoxazine (IV) or the N-acetic acid derivatives, and the chlorinating agent is thionyl chloride.

(IV) 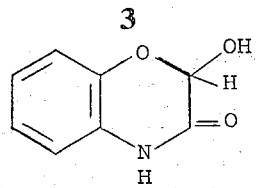

Said precursor can be obtained by the method shown in Acta Chem. Scanda., Vol. 14, pp. 504–507 (1960).

The compounds of this invention wherein Y is sulfoxide are readily prepared from those compounds wherein Y is sulfur. The latter are reacted with an oxidizing agent such as a perbenzoic acid to produce the former. It will also be recognized that all of the compounds of this invention wherein X is alkyl can be simply hydrolyzed to the corresponding acid. That acid in turn can be esterified with an alkanol.

The following illustrative, non-limiting examples will further demonstrate to those skilled in the art the manner in which specific compounds of this invention can be prepared.

EXAMPLE I

A mixture of 40 gm. (0.14 mole) of ethyl 2-chloro-3,4-dihydro-3-oxo-2H-1,4-benzothiazine-4-acetate and 51 gm. (0.31 mole) or triethyl phosphite is refluxed gently for about 28 hours to obtain an amber colored solution. Volatile materials are removed from the solutions by heating on a steam bath for 30 minutes at 0.1 Torr. The residue is treated with 20 ml. of warm ethanol, and then with 200 ml. of petroleum ether. Cooling of the solution with Dry Ice gives separation of an oil which crystallizes when it is warmed and scratched with a glass rod. Filtration gives 32 gm. of a tan solid. Evaporation of the filtrate and treatment of the residue with petroleum ether gives, after cooling, 18 gm. of a brown solid. Chromatography of 43.0 gms. of the crude material on alumina results in the isolation of 24 gm. of solid. Recrystallization of the total from benzene-petroleum ether yields 18.5 gm. of ethyl 2-diethoxy-phosphinyl-3,4-dihydro-3-oxo- 2H-1,4-benzothiazine-4-acetate as a white solid.

To a stirred solution of 3.87 gm. (0.01 mole) of the above product and 1.74 gm. (0.01 mole) of m-trifluoromethylbenzaldehyde in 25 ml. of ethanol, there is added 5.0 ml. of a 2.0 N solution of sodium ethoxide (0.01 mole). A yellow solid precipitates immediately. An additional 25 ml. of ethanol is added, and the mixture is stirred for about 30 minutes. Filtration of the mixture gives 3.08 gm. of a yellow product. This material is dissolved in 30 ml. of chloroform, and the solution is washed twice with 10 ml. portions of water, dried (MgSO$_4$) and concentrated to a solid residue. The residue is recrystallized from 75 ml. of benzene-petroleum ether (1:2) to give 2.65 gm. of ethyl 3,4-dihydro-3-oxo-2-(m-trifluoromethyl)benzylidene-2H-1,4-benzothiazine-4-acetate, m.p. 131°–131.5°C., as fluffly yellow crystals. Elemental analysis gives 59.09% carbon, 3.98% hydrogen and 7.93% sulfur as against calculated values of 58.96%, 3,96% and 7.87% for C$_{20}$H$_{16}$F$_3$NO$_3$S.

EXAMPLE II

The procedure of Example I is followed except that the m-trifluoromethylbenzaldehyde is replaced by a substantially equimolar amount of piperonal. The product, obtained as a yellow solid, is ethyl 3,4-dihydro-2-(3,4-methylenedioxy)-benzylidene-3-oxo-2H-1,4-benzothiazine-4-acetate, m.p. 113°–114°C. Elemental analysis gives 62.65% carbon, 4.51% hydrogen and 8.27% sulfur as against calculated values of 62.65%, 4.47% and 8.36% for C$_{20}$H$_{17}$NO$_5$S.

EXAMPLE III

The procedure of Example I is followed except that the m-trifluoromethylbenzaldehyde is replaced by a substantially equimolar amount of p-methoxybenzaldehyde. The product, obtained as a pale yellow solid, is ethyl 3,4-dihydro-2-(p-methoxy)benzylidene-3-oxo-2H-1,4-benzothiazine-4-acetate, m.p. 129°–130°C. Elemental analysis gives 65.10% carbon, 5.21% hydrogen and 8.76% sulfur as against calculated values of 65.02%, 5.18% and 8.68% for C$_{20}$H$_{19}$NO$_4$S.

EXAMPLE IV

The procedure of Example I is followed except that the m-trifluoromethylbenzaldehyde is replaced by a substantially equimolar amount of m-nitrobenzaldehyde. The product, obtained as a yellow solid, is ethyl 3,4-dihydro-2-(m-nitro)benzylidene-3-oxo-2H-1,4-benzothiazine-4-acetate, m.p. 145°–146°C. Elemental analysis gives 59.44% carbon, 4.29% hydrogen and 7.26% nitrogen as against calculated values of 59.37%, 4.20% and 7.29% for C$_{19}$H$_{16}$N$_2$O$_5$S.

EXAMPLE V

The procedure of Example I is followed except that the m-trifluoromethylbenzaldehyde is replaced by a substantially equimolar amount of 2,4-dichlorobenzaldehyde. The product, obtained as a yellow solid, is ethyl 3,4-dihydro-2-(2,4-dichloro)benzylidene-3-oxo-2H-1,4-benzothiazine-4-acetate, m.p. 116°–117°C. Elemental analysis gives 55.59% carbon, 3.73% hydrogen and 17.23% chlorine as against calculated values of 55.89%, 3.70% and 17.37% for C$_{19}$H$_{15}$Cl$_2$NO$_3$S.

EXAMPLE VI

A stirred mixture of 26.5 gm. of 2-chloro-3,4-dihydro-3-oxo-2H-1,4-benzothiazine and 101.0 ml. of triethyl phosphite is heated at about 100°C. A vigorous exothermic reaction occurs, and a clear orange solution is obtained. The solution is stirred at reflux for 1.5 hours, cooled to about 60°C., and diluted with 100 ml. of petroleum ether. Further cooling to room temperature, filtration of a pale yellow solid, and recrystallization from benzene-petroleum ether gives 2-diethoxy-phosphinyl-3,4-dihydro-3-oxo-2H-1,4-benzothiazine.

To a stirred solution of 4.5 gm. (0.015 mole) of the above product and 2.04 gm. (0.015 mole) of o-methoxybenzaldehyde in 25 ml. of methanol, there is added 7.5 ml. of a 2.0 N solution of sodium methoxide in methanol. The mixture is allowed to stand for 30 minutes, and it is then filtered to yield 2-(o-methoxy)benzylidene-3,4-dihydro-3-oxo-2H-1,4-benzothiazine.

To a stirred, refluxing solution of 3.7 gm. (0.013 mole) of this latter product in 225 ml. of acetone, there is added 3.2 gm. (0.057 mole) of coarsely powdered potassium hydroxide. This is followed immediately be the addition of 2.34 gm. (0.014 mole) of ethyl bromoacetate. The mixture is refluxed with stirring for an additional 10 minutes and then filtered while hot. The filtrate is concentrated to an oil which is titurated with petroleum ether to give a light colored solid. This solid is dissolved in 100 ml. of chloroform, and the solution is washed with two 35 ml. portions of water, dried (MgSO$_4$) and concentrated to a solid residue. The residue is recrystallized from chloroform-petroleum ether (1:10) to yield ethyl 3,4-dihydro-2-(o-methoxy)benzylidene-3-oxo-2H-1,4-benzothiazine-4-acetate, m.p. 91-93°C., as a cream solid. Elemental analysis gives 65.16% carbon, 5.26% hydrogen and 8.60% sulfur as against calculated values of 65.02%, 5.18% and 8.68% for C$_{20}$H$_{19}$NO$_4$S.

EXAMPLE VII

The procedure of Example VI is followed except that the o-methoxybenzaldehyde is replaced by a substantially equimolar amount of m-methoxybenzaldehyde. The final product, obtained as a yellow solid, is ethyl 3,4-dihydro-2-(m-methoxy)-benzylidene-3-oxo-2H-1,4-benzothiazine-4-acetate, m.p. 59°-60°C. Elemental analysis gives 64.96% carbon, 5,26% hydrogen and 8.60% sulfur as against calculated values of 65.02%, 5.18% and 8.68% for C$_{20}$H$_{19}$NO$_4$S.

EXAMPLE VIII

The procedure of Example VI is followed except that the o-methoxybenzaldehyde is replaced by a substantially equimolar amount of p-dimethylaminobenzaldehyde. The final product, obtained as a yellow solid, is ethyl 3,4-dihydro-2-(p-dimethylamino)benzylidene-3-oxo-2H-1,4-benzothiazine-4-acetate, m.p. 119°-120.5°C. Elemental analysis gives 65.84% carbon, 5.85% hydrogen and 2.26% nitrogen as against calculated values of 65.95% 5.80% and 2.32% for C$_{21}$H$_{22}$N$_2$O$_3$S.

EXAMPLE IX

The procedure of Example VI is followed except that the o-methoxybenzaldehyde is replaced by a substantially equimolar amount of 3,5-dimethoxybenzaldehyde. The final product, obtained as a pale yellow solid, is ethyl 3,4-dihydro-2-(3,5-dimethoxy)benzylidene-3-oxo-2H-1,4-benzothiazine-4-acetate, m.p. 121°-122.5°C. Elemental analysis gives 62.95% carbon, 5.35% hydrogen and 7.97% sulfur as against calculated values of 63.14%, 5.30% and 8.03% for C$_{21}$H$_{21}$NO$_5$S.

EXAMPLE X

The procedure of Example VI is followed except that the o-methoxybenzaldehyde is replaced by a substantially equimolar amount of 4-methoxy-3-methylbenzaldehyde. The final product, obtained as a yellow solid, is ethyl 3,4-dihydro-2-(4-methoxy-3-methyl)benzylidene-3-oxo-2H-1,4-benzothiazine-4-acetate, m.p. 95°-96°C. Elemental analysis gives 65.55% carbon, 5.46% hydrogen and 8.37% sulfur as against calculated values of 65.78%, 5.52% and 8.36% for C$_{21}$H$_{21}$NO$_4$S.

EXAMPLE XI

A mixture of 13.4 gm. (0.036 mole) of the product of Example III and 3.2 gm. (0.08 mole) of sodium hydroxide in 60 ml. of water is heated at reflux for about 2.3 hours. The solution is cooled and deposits 10 gm. of the sodium salt of the desired acid. This salt is then treated with an excess of 5N hydrochloric acid solution, and the mixture is stirred for about 65 hours at room temperature. Filtration of this mixture gives 3,4-dihydro-2-(p-methoxy)benzylidene-3-oxo-2H-1,4-benzothiazine-4-acetic acid, m.p. 180-182°C., as a light yellow solid. Elemental analysis gives 63.28% carbon, 4.50% hydrogen and 9.34% sulfur as against calculated values of 63.33%, 4.43% and 9.39% for C$_{18}$H$_{15}$NO$_4$S.

EXAMPLE XII

To a suspension of 2.0 gm. (0.006 mole) of the product of Example XI in 40 ml. of isopropanol, there is added 1 ml. of concentrated sulfuric acid. The suspension is refluxed for 17.5 hours and filtered while hot. The filtrate is concentrated to an oil which is dissolved in 125 ml. of chloroform. The solution is washed with two 75 ml. portions of aqueous sodium bicarbonate solution, dried (MgSO$_4$) and concentrated to a solid residue. This residue is recrystallized twice from chloroform-petroleum ether (1:6). The product, obtained as a pale yellow solid, is isopropyl 3,4-dihydro-2-(p-methoxy)benzylidene-3-oxo-2H-1,4-benzothiazine-4-acetate, m.p. 111°-112°C. Elemental analysis gives 65.70% carbon, 5.54% hydrogen and 8.34% sulfur as against calculated values of 65.78%, 5.52% and 8.36% for C$_{21}$H$_{21}$NO$_4$S.

EXAMPLE XIII

The procedure of Example VI is followed except that the o-methoxybenzaldehyde is replaced by a substantially equimolar amount of 3-fluoro-4-methoxybenzaldehyde. The final product, obtained as a light yellow solid, is ethyl 3,4-dihydro-2-(3-fluoro-4-methoxy)benzylidene-3-oxo-2H-1,4-benzothiazine-4-acetate, m.p. 97°-97.5°C. Elemental analysis gives 62.19% carbon, 4.65% hydrogen and 8.36% sulfur as against calculated values of 62.00%, 4.68% and 8.28% for C$_{20}$H$_{18}$FNO$_4$S.

EXAMPLE XIV

The procedure of Example VI is followed except that the o-methoxybenzaldehyde is replaced by a substantially equimolar amount of benzaldehyde. The final product, obtained as a pale yellow solid, is ethyl 3,4-dihydro-2-benzylidene-3-oxo-2H-1,4-benzothiazine-4-acetate, m.p. 69.5°-70.5°C. Elemental analysis gives 67.18% carbon, 5.08% hydrogen and 9.49% sulfur as against calculated values of 67.24%, 5.05% and 9.45% for C$_{19}$H$_{17}$NO$_3$S.

EXAMPLE XV

The procedure of Example VI is followed except that the o-methoxybenzaldehyde is replaced by a substantially equimolar amount of 3,4,5-trimethoxybenzaldehyde. The final product, obtained as a yellow solid, is ethyl 3,4-dihydro-2-(3,4,5-trimethoxy)benzylidene-3-oxo-2H-1,4-benzothiazine-4-acetate, m.p. 244°-246°C. Elemental analysis gives 61.29% carbon, 5.52% hydrogen and 7.45% sulfur as against calculated values of 61.52%, 5.40% and 7.47% for C$_{22}$H$_{23}$NO$_6$S.

EXAMPLE XVI

The procedure of Example VI is followed except that the o-methoxybenzaldehyde is replaced by a substantially equimolar amount of 2,4,6-trimethoxybenzaldehyde. The final product, obtained as a yellow solid, is ethyl 3,4-dihydro-2-(2,4,6-trimethoxy)benzylidene-3-oxo-2H-1,4-benzothiazine-4-acetate, m.p. 165.5°-167°C. Elemental analysis gives 61.61% carbon, 5.45% hydrogen and 7.47% sulfur as against calculated values of 61.52%, 5.40% and 7.47% for C$_{22}$H$_{23}$NO$_6$S.

EXAMPLE XVII

The procedure of Example VI is followed except that the o-methoxybenzaldehyde is replaced by a substantially equimolar amount of p-methylthiobenzaldehyde. The final product, obtained as a yellow solid, is ethyl 3,4-dihydro-2-(p-methylthio)benzylidene-3-oxo-2H-1,4-benzothiazine-4-acetate, m.p. 120°–121.5°C. Elemental analysis gives 62.51% carbon, 4.93% hydrogen and 16.51% sulfur as against calculated values of 62.31%, 4.97% and 16.63% for $C_{20}H_{19}NO_3S_2$.

EXAMPLE XVIII

The procedure of Example VI is followed except that the o-methoxybenzaldehyde is replaced by a substantially equimolar amount of m-fluorobenzaldehyde. The final product, obtained as a yellow solid, is ethyl 3,4-dihydro-2-(m-fluoro)-benzylidene-3-oxo-2H-1,4-benzothiazine-4-acetate, m.p. 84.5°–85.5°C. Elemental analysis gives 63.72% carbon, 4.51% hydrogen and 9.10% sulfur as against calculated values of 63.85%, 4.51% and 8.97% for $C_{19}H_{16}FNO_3S$.

EXAMPLE XIX

The procedure of Example VI is followed except that the o-methoxybenzaldehyde is replaced by a substantially equimolar amount of 3,4-dichlorobenzaldehyde. The final product, obtained as a bright yellow solid, is ethyl 3,4-dihydro-2-(3,4-dichloro)benzylidene-3-oxo-2H-1,4-benzothiazine-4-acetate, m.p. 138°–139°C. Elemental analysis gives 55.61% carbon, 3.79% hydrogen and 17.23% chlorine as against calculated values of 55.89%, 3.70% and 17.37% for $C_{19}H_{15}Cl_2NO_3S$.

EXAMPLE XX

The procedure of Example VI is followed except that the o-methoxybenzaldehyde is replaced by a substantially equimolar amount of p-tolualdehyde. The final product, obtained as a pale yellow solid, is ethyl 3,4-dihydro-2-(p-methyl)benzylidene-3-oxo-2H-1,4-benzothiazine-4-acetate, m.p. 110°–111°C. Elemental analysis gives 68.08% carbon, 5.45% hydrogen and 9.02% sulfur as against calculated values of 67.97%, 5.42% and 9.07% for $C_{20}H_{19}NO_3S$.

EXAMPLE XXI

The procedure of Example VI is followed except that the o-methoxybenzaldehyde is replaced by a substantially equimolar amount of cyclohexanone. After addition of the sodium methoxide in methanol, the solution is stirred for four hours. About 5 ml. of water is then added, and stirring is continued for about 16 hours. The intermediate benzothiazine is recovered by filtration and thereafter reacted with ethyl bromoacetate. The final product, obtained as a cream white solid, is ethyl 2-cyclohexylidene-3,4-dihydro-3-oxo-2H-1,4-benzothiazine-4-acetate, m.p. 89°–91°C. Elemental analysis gives 65.07% carbon, 6.43% hydrogen and 9.55% sulfur as against calculated values of 65.23%, 6.39% and 9.67% for $C_{18}H_{21}NO_3S$.

EXAMPLE XXII

The procedure of Example XXI is followed except that the cyclohexanone is replaced by a substantially equimolar amount of acetone. The final product, obtained as a white solid, is ethyl 3,4-dihydro-2-isopropylidene-3-oxo-2H-1,4-benzothiazine-4-acetate, m.p. 75°–76°C. Elemental analysis gives 61.84% carbon, 5.97% hydrogen and 10.92% sulfur as against calculated values of 61.83%, 5.88% and 11.00% for $C_{15}H_{17}NO_3S$.

EXAMPLE XXIII

The procedure of Example VI is followed except that the o-methoxybenzaldehyde is replaced by a substantially equimolar amount of p-nitrobenzaldehyde. The final product, obtained as a bright yellow-orange solid, is ethyl 3,4-dihydro-2-(p-nitro)benzylidene-3-oxo-2H-1,4-benzothiazine-4-acetate, m.p. 164°–165°C. Elemental analysis gives 59.29% carbon, 4.23% hydrogen and 8.49% sulfur as against calculated values of 59.37%, 4.20% and 8.34% for $C_{19}H_{16}N_2O_5S$.

EXAMPLE XXIV

The procedure of Example VI is followed except that the o-methoxybenzaldehyde is replaced by a substantially equimolar amount of p-ethoxybenzaldehyde. The final product, obtained as a pale yellow solid, is ethyl 3,4-dihydro-2-(p-ethoxy)benzylidene-3-oxo-2H-1,4-benzothiazine-4-acetate, m.p. 80°–80.5°C. Elemental analysis gives 65.61% carbon, 5.56% hydrogen and 8.44% sulfur as against calculated values of 65.78%, 5.52% and 8.36% for $C_{21}H_{21}NO_4S$.

EXAMPLE XXV

The procedure of Example VI is followed except that the o-methoxybenzaldehyde is replaced by a substantially equimolar amount of p-chlorobenzaldehyde. The final product, obtained as a light yellow solid, is ethyl 3,4-dihydro-2-(p-chloro)benzylidene-3-oxo-2H-1,4-benzothiazine-4-acetate, m.p. 148°–149°C. Elemental analysis gives 60.89% carbon, 4.36% hydrogen and 8.59% sulfur as against calculated values of 61.04%, 4.31% and 8.58% for $C_{19}H_{16}ClNO_3S$.

EXAMPLE XXVI

A solution of 2.02 gm. (0.01 mole) of m-chloroperbenzoic acid in 50 ml. of chloroform is added dropwise over one hour to a stirred solution of 3.7 gm. (0.01 mole) of the product of Example III in 50 ml. of chloroform. The resultant solution is stirred for about 16 hours. It is then washed with two 50 ml. portions of 5% sodium bicarbonate, dried (MgSO$_4$), and concentrated to a yellow residue which gives an off-white solid when titurated with petroleum ether. This solid is recrystalized twice from ethanol. The product, obtained as an off-white solid, is ethyl 3,4-dihydro-1,3-dioxo-2-(p-methoxy)-benzylidene-2H-1,4-benzothiazine-4-acetate, m.p. 142°–143°C. Elemental analysis gives 62.41% carbon, 5.00% hydrogen and 8.25% sulfur as against calculated values of 62.32%, 4.97% and 8.32% for $C_{20}H_{19}NO_5S$.

EXAMPLE XXVII

A mixture of 24.5 gms. of 2-chloro-3,4-dihydro-3-oxo-2H-1,4-benzoxazine is heated at reflux with 50 ml. of triethyl phosphite, and a vigorous exothermic reaction occurs. The resultant solution is heated for an additional hour, after which it is cooled and treated with 150 ml. of petroleum ether. A gummy material which separates crystallizes upon scratching. Recrystallization from 200 ml. of benzene-petroleum ether (1:1) gives 2-diethoxyphosphinyl-3,4-dihydro-3-oxo-2H-1,4-benzoxazine.

To a stirred solution of 7.13 gm. (0.025 mole) of the above product and 3.4 gm. (0.025 mole) of p-methoxybenzaldehyde in 25 ml. of ethanol, there is added 25 ml. of a 1.0 N solution of sodium ethoxide in ethanol. A white solid precipitates, after which the reaction mixture is stirred for 30 minutes and filtered to yield 2-(p-methoxy)benzylidene-3,4-dihydro-3-oxo-2H-1,4-benzoxazine.

To a stirred, refluxing solution of this latter product in 200 ml. of acetone, there is added 4.5 gm. (0.068 mole) of coarsely powdered potassium hydroxide, and a clear solution is obtained. This is followed immediately by the addition of 3.3 gm. (0.03 mole) of ethyl bromoacetate in a single portion. The mixture is refluxed with stirring for 5 minutes and then filtered while hot. The filtrate is concentrated to a yellow solid, treated with 75 ml. of chloroform, and washed twice with 35 ml. portions of water. The organic phase is dried ($MgSO_4$) and concentrated to a solid which is collected with the aid of petroleum ether. The product, recrystallized from 300 ml. of ethanol as a white solid, is ethyl 3,4-dihydro-2-(p-methoxy)benzylidene-3-oxo-2H-1,4-benzoxazine-4-acetate, m.p. 156°–157°C. Elemental analysis gives 67.89% carbon, 5.51% hydrogen and 3.87% nitrogen as against calculated values of 67.98%, 5.42% and 3.96% for $C_{20}H_{19}NO_5$.

EXAMPLE XXVIII

The procedure of Example XXVII is followed except that the p-methoxybenzaldehyde is replaced by a substantially equimolar amount of p-chlorobenzaldehyde. The final product, obtained as a white fluffy solid, is ethyl 3,4-dihydro-2-(p-chloro)benzylidene-3-oxo-2H-1,4-benzoxazine-4-acetate, m.p. 205°–208°C. Elemental analysis gives 63.74% carbon, 4.54% hydrogen and 9.96% chlorine as against calculated values of 63.78%, 4.51% and 9.91% for $C_{19}H_{16}ClNO_4$.

As stated above, compounds of this invention have been found to display herbicidal activity when employed in the treatment of undesired plants (weeds). Such activity has been observed in both preemergent applications (prevention of growth) and post emergent applications (destruction of plants). In testing to demonstrate herbicidal activity, a good grade of top soil is placed in aluminum pans and compacted to a depth of three-eighths to one-half inch from the top of the pan. A predetermined number of seed of each of several undesired plant species are placed on top of this soil, and these seeds are then covered with additional soil leveled to the top of the pan. In the preemergent test, a solution containing the compound being tested is sprayed on the top layer of soil, after which the pan is placed in a greenhouse and watered as needed. In the post emergent test, the seeds are first grown in the greenhouse for 14 days. Then, a solution of the test compound is sprayed on the plant foliage, and the pans are returned to the greenhouse and watered as needed. Untreated pans of seeds and 14 day old plants are prepared in the same manner. About two weeks after the treatments, the number of plants of each species growing in the treated and untreated pans is compared to determine the herbicidal effectiveness of the test compounds applied.

In these tests there were 11 plant species, of which 5 were grasses and 6 were broadleaf. The particular broadleaf species were Canada thistle, cocklebur, velvet leaf, morning glory, lambsquarter and smartweed, although the last-named species did not even grow in the control pans. Thus, for all practical purposes, only the other 5 broadleaf species should be considered as present in the tests. Application rates of 4, 5 or 10 pounds per acre were used in the preemergent treatments. The compounds of Example I, IV, V, IX and XIX were not active in this test at these rates. The compounds of all of the other examples herein were found to at least prevent the growth of 25–49% of at least one of the broadleaf species tested. Application rates of 4 or 10 pounds per acre were used in the post emergent treatments, and only the compound of Example IV was inactive in this test at these rates. All of the other compounds of the examples killed at least 25–49% of the plants of one or more of the broadleaf species. In general, none of the compounds was effective against the grass species in either test at the rates applied.

As stated above, compounds of this invention have also been found to display beneficial, plant growth regulating activity when employed in the treatment of desired plants (crops). Such plant growth regulation is particularly useful when said compounds are applied to dicotyledonous crops such as legumes, seed vegetables and fiber plants. In testing to demonstrate growth regulating responses, a number of soybean plants (Corsoy variety), a representative legume, are grown from seed in aluminum pans in a greenhouse. About one to two weeks after planting, when the unifoliate leaves of the plants are fully expanded, they are sprayed with an aqueous solution of the test compound formulated with a small amount of surfactant. The treated plants are then grown in the greenhouse for about two additional weeks, after which observations are made and compared with observations of untreated control plants.

The compounds of Examples I through XVIII, XXI and XXII were applied to the soybean plants in this test at a rate of about 6.0 pounds per acre. Plants treated with these compounds all showed development of axillary buds. With seventeen of these compounds, the apical development of the plants was inhibited, while sixteen of the compounds caused alteration of the leaves. Stature reduction or stunting occurred with nine of the compounds, and a thickened leaf texture was observed with seven of the compounds. Responses noted with lesser frequency included stem and leaf distortion, leaf inhibition and an altered canopy. Similar responses were noted using these compounds in this test at lower rates of 3.0, 1.2, 0.6 and 0.3 pounds per acre.

Cotton (Grigg variety), a representative fiber plant, was also tested in the manner just described. The treated plants in this test were three weeks old at the time of application, and the compounds employed were those of Examples I through X, XII, XIII, XV through XVIII, XXI and XXII. At a rate of about 6.0 pounds per acre, leaf distortion and inhibition of apical development was observed with sixteen of the test compounds. Cotton plants treated with fourteen of the compounds had a thicker leaf texture, and ten of the compounds caused some leaf inhibition. Other, less frequently, noted responses were stunting and the development of axillary buds. Similar responses were observed using a number of these compounds in this test at lower rates of 3.0, 1.2 and 0.6 pounds per acre.

Tests of the kind just described were also conducted with tomato (Campbell variety), a representative seed vegetable. The tomato plants used in this test were three weeks old at the time of application, and treatments were made with the same compounds as were used in the tests on cotton. At the rate of about 6.0 pounds per acre, inhibited apical development was noted with 16 of the compounds, and leaf alteration was noted with 15 compounds. Eleven of the compounds caused an altered canopy, while leaf distortion was observed in eleven of the treatments. Axillary bud development, stem distortion, leaf inhibition and stature reduction were also noted as responses, but these occurred with lesser frequency. Similar responses were observed at lower treatment rates of 3.0, 1.2 and 0.6 pounds per acre with a number of these compounds.

In the treatment of desired plants (crops) with compounds of this invention, it should be understood that effective, non-lethal, plant growth regulating rates of application are employed as illustrated above. As may be expected, such effective amounts will vary, not only with the particular chemical selected for the treatment, but also with the regulatory effect to be achieved, the species of plant being treated, and the stage of plant maturity. Other factors which may bear upon the determination of an appropriate plant regulating amount include the plant growth medium, the manner of application, and weather conditions such as temperature and rainfall.

When utilizing compounds of this invention for regulating the growth of dicotyledonous crop plants, it is preferred to employ those members of the general formula wherein Y is sulfur, X is lower alkyl, and Z is

It is particularly preferred to use those compounds wherein R'' is

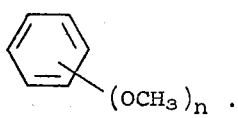

While the invention has been described herein with regard to certain representative examples for purpose of illustrating its practice, it is not to be construed as limited thereto. Those skilled in the art will readily recognize the variations and modifications which can be made without departing from the spirit and scope of the invention.

What is claimed is:
1. A compound of the formula

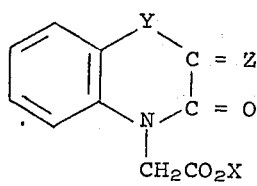

wherein X is hydrogen or alkyl of up to four carbon atoms, Y is oxygen, sulfur or sulfoxide, and Z is cyclohexylidene, or

wherein R and R' are each independently hydrogen or lower alkyl, or

wherein R'' is phenyl, styryl, 3,4-methylenedioxyphenyl or

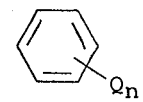

wherein n is an integer from one to three, and Q is halogen, nitro, amino, di(lower alkyl)amino, lower alkyl, lower alkoxy, lower alkylthio, hydroxy or trifluoromethyl.

2. A compound as defined in claim 1 wherein Y is oxygen.
3. A compound as defined in claim 2 wherein Z is

4. A compound as defined in claim 1 wherein Y is sulfoxide.
5. A compound as defined in claim 4 wherein Z is

6. A compound as defined in claim 1 wherein Y is sulfur.
7. A compound as defined in claim 6 wherein Z is

8. A compound as defined in claim 7 wherein R'' is

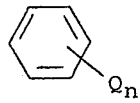

9. A compound as defined in claim 8 wherein Q is methoxy.
10. A compound as defined in claim 9 wherein n is one.
11. A compound as defined in claim 7 wherein X is lower alkyl.
12. A compound as defined in claim 11 wherein X is ethyl.

* * * * *